June 9, 1931.   A. H. TASHJIAN   1,809,223
COMBINED CONDUIT AND MOLDING
Filed May 15, 1928    2 Sheets-Sheet 2
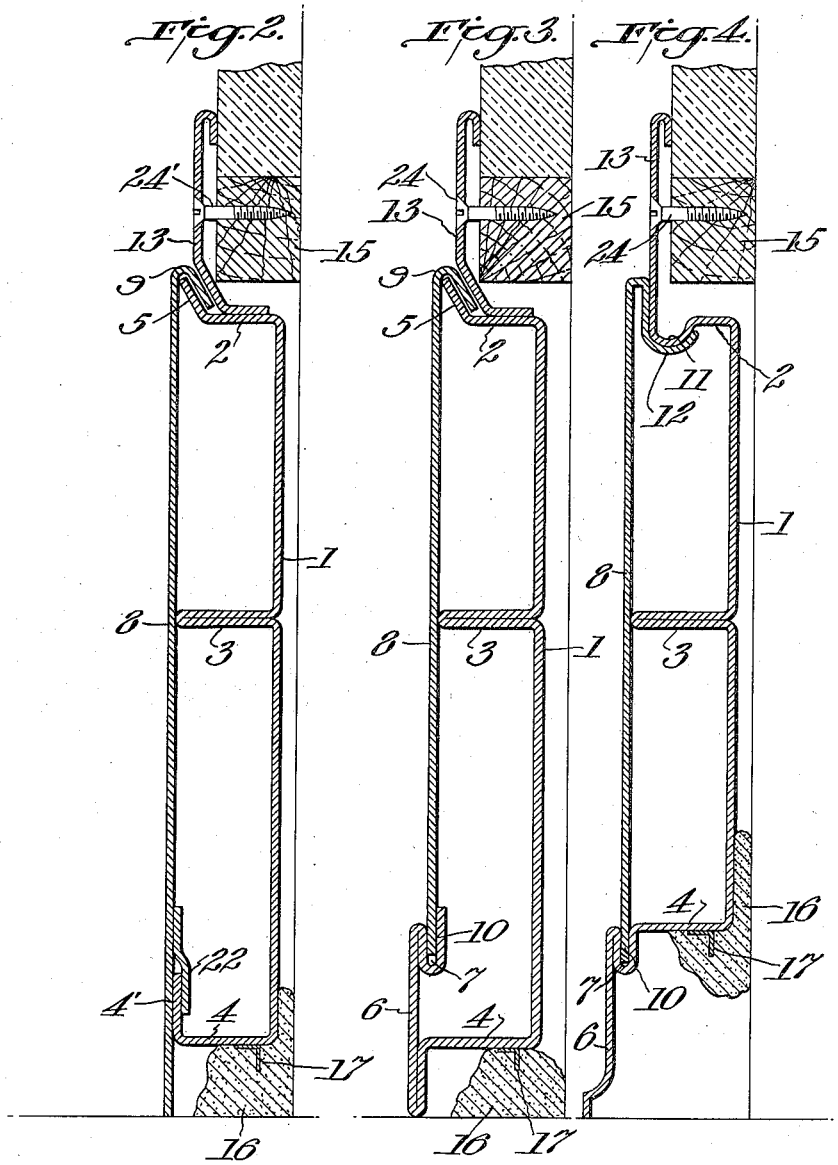

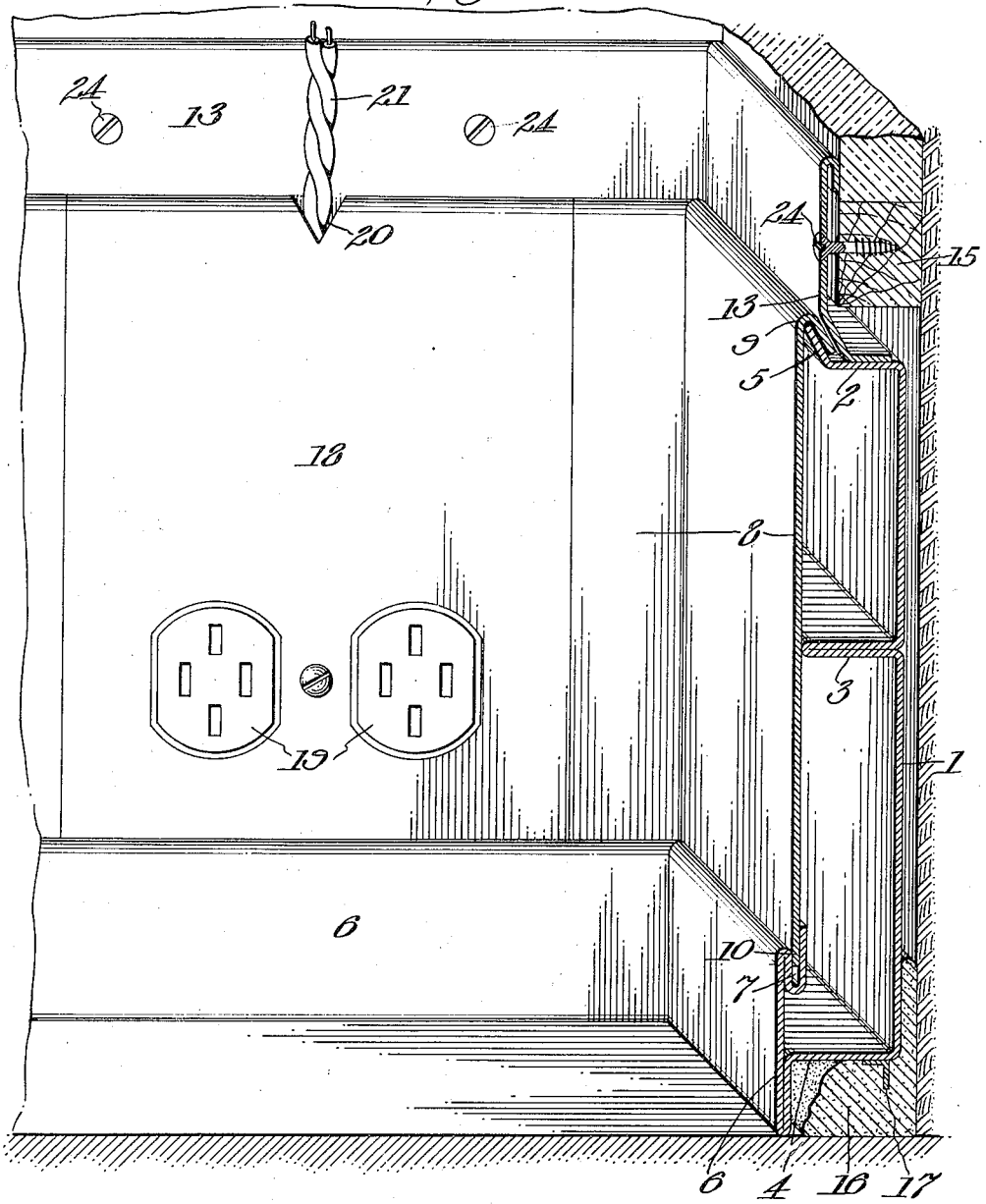

Patented June 9, 1931

1,809,223

UNITED STATES PATENT OFFICE

ARMEN H. TASHJIAN, OF CLEVELAND, OHIO

COMBINED CONDUIT AND MOLDING

Application filed May 15, 1928. Serial No. 277,991.

This invention relates to a combined electrical conduit and molding, suitable for installation in buildings primarily as a baseboard, but capable of adaptation for other uses, for example as a cornice mold or chair rail.

The invention embodies improvements upon and simplifications of the disclosures of my Patents No. 1,437,324, granted November 28, 1922, and No. 1,611,325, granted December 21, 1926.

With the advent of the shallow type of receptacles, the depth of which is notably less than that of the old types, I have found it possible to construct a combined conduit and molding of fewer component parts than those disclosed in my patents mentioned and yet having all of their advantages, and so shallow that it may be brought substantially within the thickness of the plaster or other finish coating of the walls with which it is used.

Other changes and improvements will be apparent as the description of the invention proceeds.

The invention consists, in one aspect, in a combined conduit and molding, comprising essentially, in two members only, a housing so formed as to provide a raceway or raceways for electric conductors, the upper portion of which acts as a plaster mold and lower portion as a mop mold, and a face plate. The invention also consists in various other novel features and improvements, as I will proceed now to explain and finally claim.

In the accompanying drawings illustrating the invention, in the several figures of which like parts are similarly designated, Figure 1 is a fragmentary, perspective, sectional view of one form of the invention, a corner installation being shown. Fig. 2 illustrates a modified treatment of the housing member and face plate. Fig. 3 is a transverse section of the form of the invention shown in Fig. 1. Fig. 4 illustrates a modified form of engaging means for the top edge of the face plate, and a modified form of finish or mop mold.

In all of the various forms of the invention illustrated, there is a housing member formed preferably of relatively rigid sheet metal and so bent as to provide, as integral parts, a back 1, top 2, partition 3 and bottom 4, and either a separate or an integral plaster mold.

The partition 3, which is so located as to divide the housing into two longitudinal raceways, may, if desired, be formed as a separate member and fixedly united to the back 1 by welding, brazing, or other appropriate means.

As shown in Figs. 1 and 3, the top 2 of the housing is provided with an upturned lip 5, and has attached to it by welding, or otherwise, a member 13 which serves both as a plaster mold and means to attach the top of the housing to the plaster ground 15, and the bottom 4 is so extended and bent upon itself as to form a finish mold or mop or shoe mold 6 and a channel 7. A face plate 8 is provided for the housing, this plate having its upper edge provided with a reentrant bend 9 forming a means whereby the upper edge of the face plate may be engaged within the channel formed between the plaster mold 13 and the lip 5 of the top of the housing. The lower edge 10 of the face plate is positioned in the channel 7 and the face plate by these means held substantially rigidly in predetermined separable relation to the housing.

In Fig. 2 I have shown a modified form of engaging means for the bottom of the face plate, the other portions of the housing being substantially the same as in Figs. 1 and 3. In this form the face plate has attached to it a member 22 so bent as to form a pocket to engage with the upturned lip 4' of the bottom 4 of the housing.

In Fig. 4 I have shown a modified form of engaging means for the upper edge of the face plate, the other portions of the housing being substantially the same as in Figs. 1 and 3, except that the plaster mold 13 is integral with the housing. In this form the top 2 of the housing is provided with a relatively rigid bead 11 and the upper edge of the face plate has a complemental lip 12 of such resiliency that when the lower edge 10 of the face plate is inserted in the channel 7 the plate may be fixed in position by snapping the lip 12 into engagement with the bead 11.

As in the case of the housing members or raceway members of my patents referred to, the housing members and face plates of the present invention may be laid end-to-end and cut to meet installation conditions, so as to form a base-board or molding around the walls of a room or other space.

In installing the members of my combined conduit and molding, the housing member sections are attached to the wall by flush head screws 24 through the plaster mold 13 to the plaster ground 15, and the bottom of the housing is stationed by means of gobs of plastic material, such as plaster of Paris, as indicated at 16, which will bond with adjacent portions of the wall and floor structure and with lugs 17 carried by the housing member.

These lugs may be sections of angle iron welded or brazed or otherwise fixed to the housing member, or they may, if desired, be struck or punched up from the material of the housing.

Obviously, conduits for conducting electric conductors will lead into the raceways of the housing member at desired locations, the housing member being provided at intervals with knock-outs of ordinary form for this purpose.

The desired arrangement of conductors having been made in the raceways, the face plates are assembled thereon simply by engaging their lower edges with the means provided therefor on the lower portion of the housing and engaging their top edges with the upper portion of the housing.

In my patents referred to I provide electrical outlets from the conductors in the raceways by detaching various sections of the face plates and so drilling, punching or cutting them at appropriate points as to provide for the attachment to them of standard receptacles.

In the present invention, however, I provide plate sections 18 (Fig. 1) approximately six inches in width and identical in cross-section with the face plates 8, and these plate sections 18 have attached to them suitable receptacles (the socket members of one such receptacle being shown at 19 in Fig. 1) which may be connected with appropriate conductors in the raceway. These plate sections are installed at desired locations in the base-board by cutting out a corresponding section of the face plate 8 and substituting the plate 18 with its attached receptacle for such section.

I have found that this means of establishing outlets is much more economical, expeditious and satisfactory than that formerly employed.

Ordinarily the lower raceway of the housing member is used for high tension wires, such as lighting and power lines, and the upper raceway for low tension wires, such as telephone, and call button or buzzer lines. Hence, receptacles, such as that carrying the socket members indicated at 19, are so positioned on the plate sections 18 as to register with the lower raceway. When it is desired to make an outlet from the upper raceway, either the plate section 18 or a section of face plate 8 may be removed and a notch, as indicated at 20, Fig. 1, filed or otherwise cut in the upper edge thereof through the reentrant bend of the material, thus forming an opening through which wires may be introduced, as shown at 21.

My improved combined conduit and molding may be manufactured at a relatively low cost; as it has only two parts, the housing member and face plate, which two parts provide a complete base-board, mop mold, plaster mold and two-raceway conduit for electrical conductors, and it provides, moreover, means (the plate sections 18) by which outlets from the raceways may be easily obtained without the former necessary cutting and fitting on the job.

It will be seen, therefore, that I provide by my invention a simple, relatively cheap, strong, durable combined conduit and molding, of neat and attractive appearance and of few and simple parts, easily assembled and installed and readily adapted to installation and electrical service requirements.

Moreover, due to the fact that the positioning of the whole structure is dependent solely upon the positioning of the housing member, its proper installation may be made by ordinary mechanics.

Various changes other than those referred to are deemed to be permissible within the spirit of the invention and the scope of the following claims.

What I claim is:—

1. A combined conduit and molding, comprising a housing member forming a raceway for electric conductors, said raceway having a back, a bottom and a top, the lower portion of said housing member being bent upon itself to form said bottom and a finish molding, a face plate for said housing member, one edge of said plate provided with a reentrant bend, means carried at the top of said housing member for engagement with the bend of said face plate, and said finish molding provided with a reentrant bend forming a channel to receive the opposite edge of said face plate, whereby the face plate is held in predetermined separable relation to said housing member.

2. A combined conduit and molding for forming a base-board in building construction, comprising a housing member forming a raceway for electric conductors, said raceway having a back a bottom and a top, the lower portion of said housing member being bent upon itself to form said bottom and an integral mop mold, a separable face plate for said housing member, and means on said face plate and means carried at the top of said housing member respectively for maintaining the upper edge of said face plate in predetermined relation to said housing member, said mop mold being provided with a reentrant bend forming a channel for the reception of the lower edge of said face plate.

3. A combined conduit and molding for incorporation in a wall structure, said combined conduit and molding comprising a housing member having a back a bottom and a top forming a raceway for electric conductors, and provided at its lower extremity with an integral mop mold provided with a longitudinal channel, a face plate for said housing member having its lower edge inserted in and positioned by said channel and provided at its upper edge with a reentrant bend, means carried at the top of said housing for detachable engagement with the reentrant bend of said face plate, and a plaster mold member carried at the upper portion of said housing member and furnishing a means for positioning and securing said housing member relatively to said wall structure.

In testimony whereof I have hereunto set my hand this 11th day of May A. D. 1928.

ARMEN H. TASHJIAN.